Figure 1:
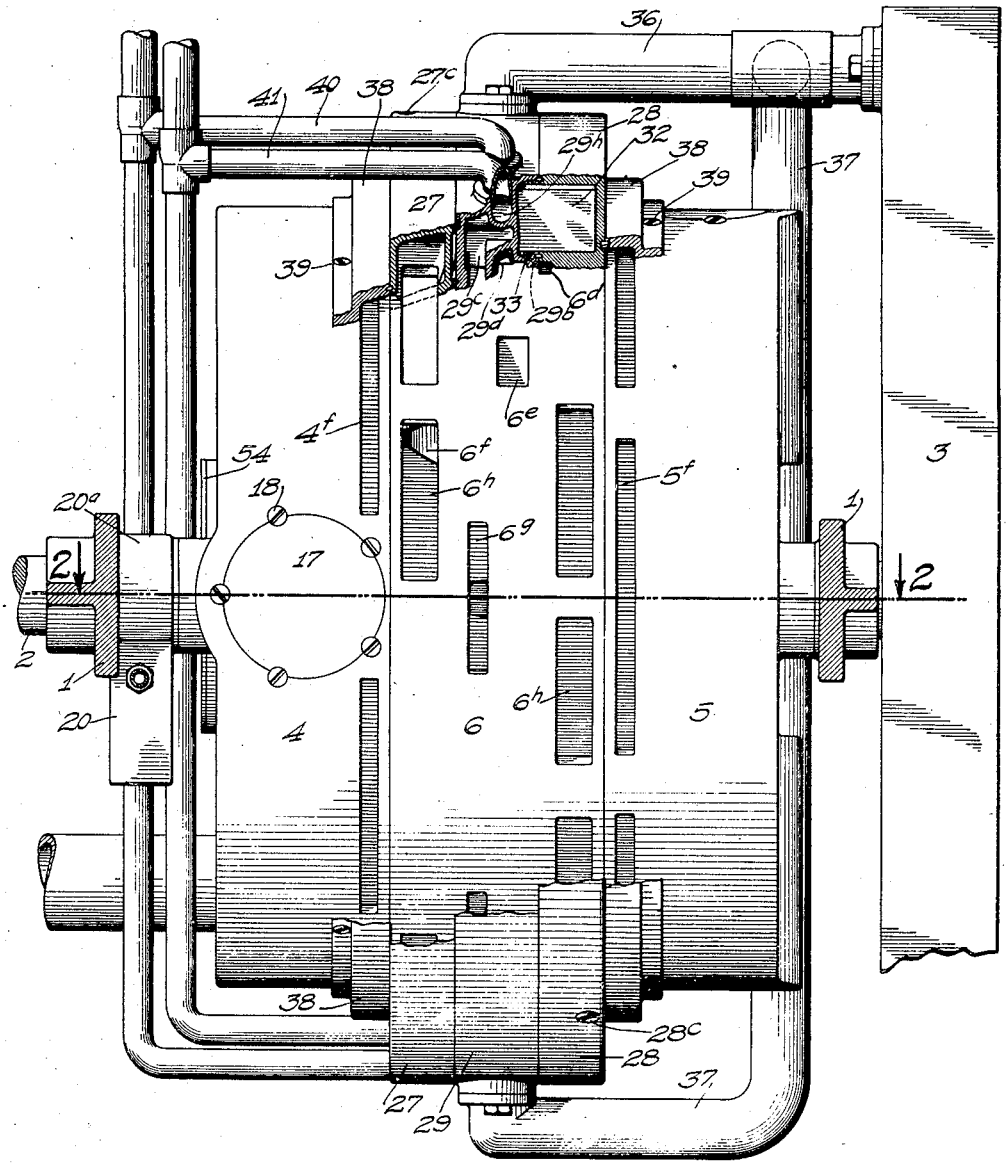

Feb. 4, 1930. R. O. McASSEY 1,745,682
GAS ENGINE
Filed March 17, 1924  6 Sheets-Sheet 1

Inventor
ROLLIN O. McASSEY.

By A. B. Bowman
Attorney

Inventor
ROLLIN O. McASSEY.
By A.B.Bowman
Attorney

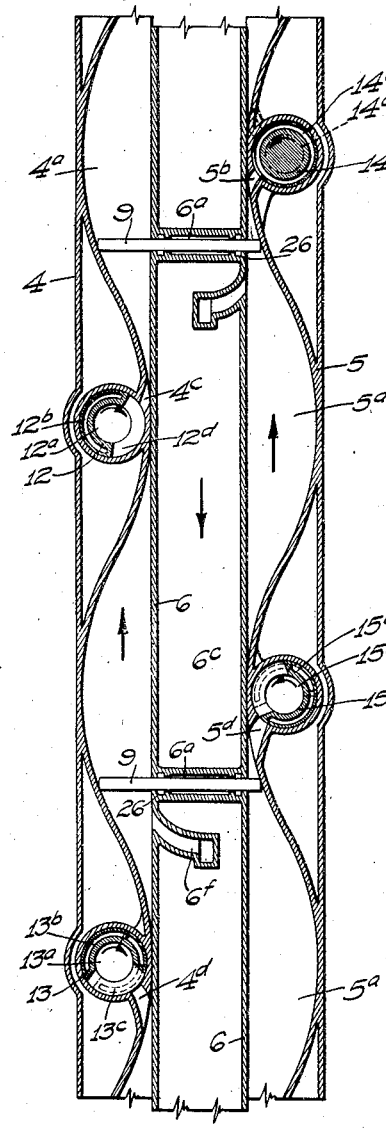
FIG. 3.
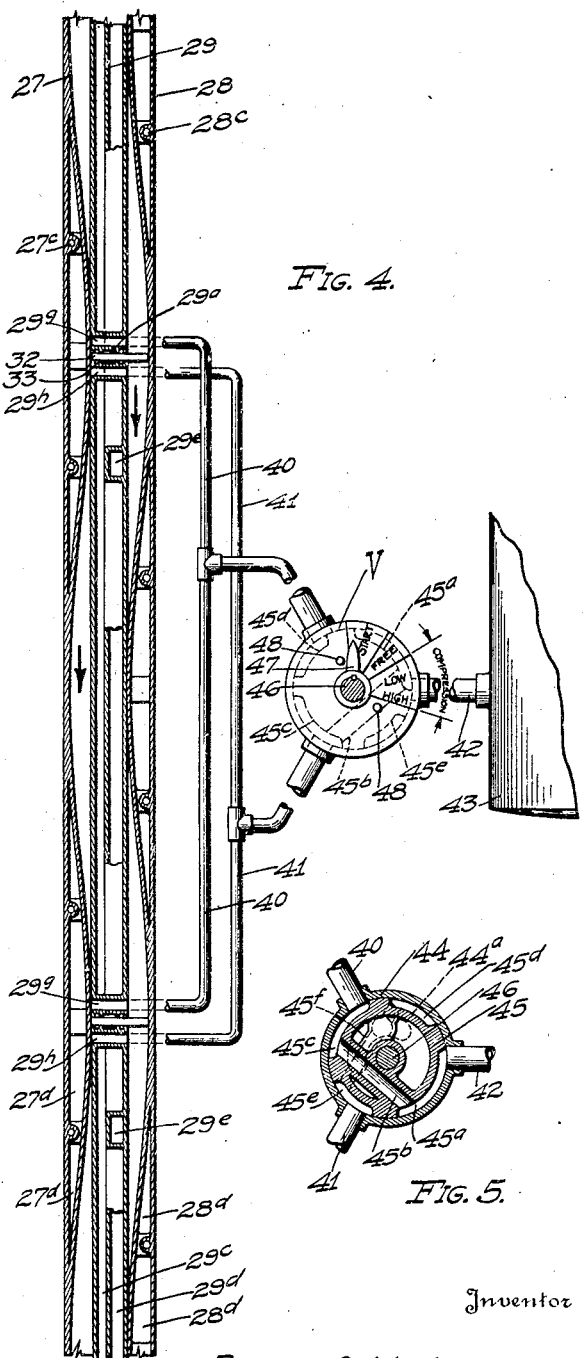
FIG. 4.
FIG. 5.
Inventor
ROLLIN O. MCASSEY.
By A. B. Bowman
Attorney Inventor
ROLLIN O. McASSEY.

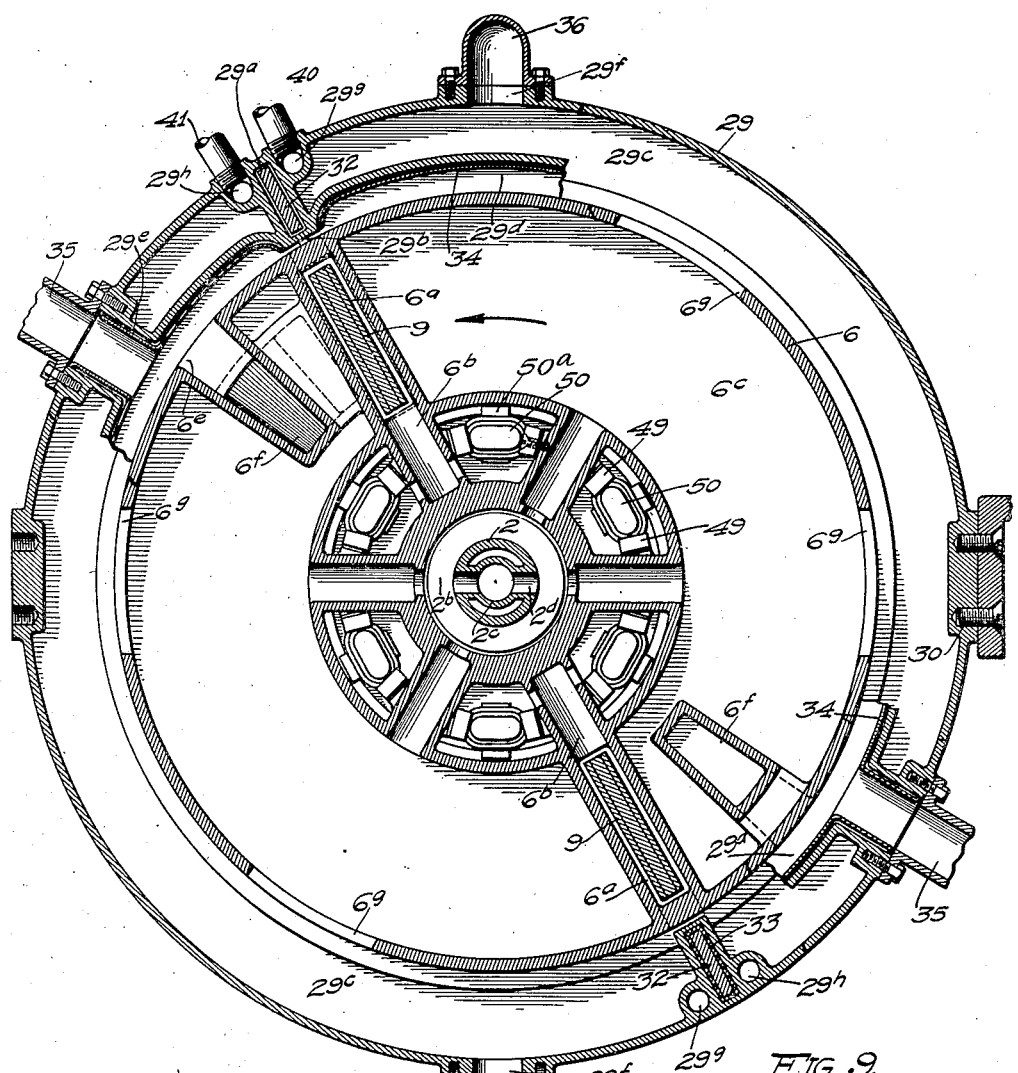
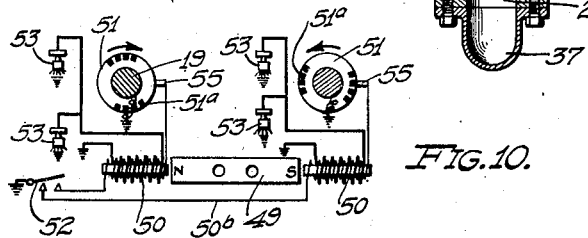
FIG. 9.
FIG. 10.
Inventor
ROLLIN O. MCASSEY.
By A. B. Bowman
Attorney Feb. 4, 1930.　　　R. O. McASSEY　　　1,745,682
GAS ENGINE
Filed March 17, 1924　　　6 Sheets-Sheet 6
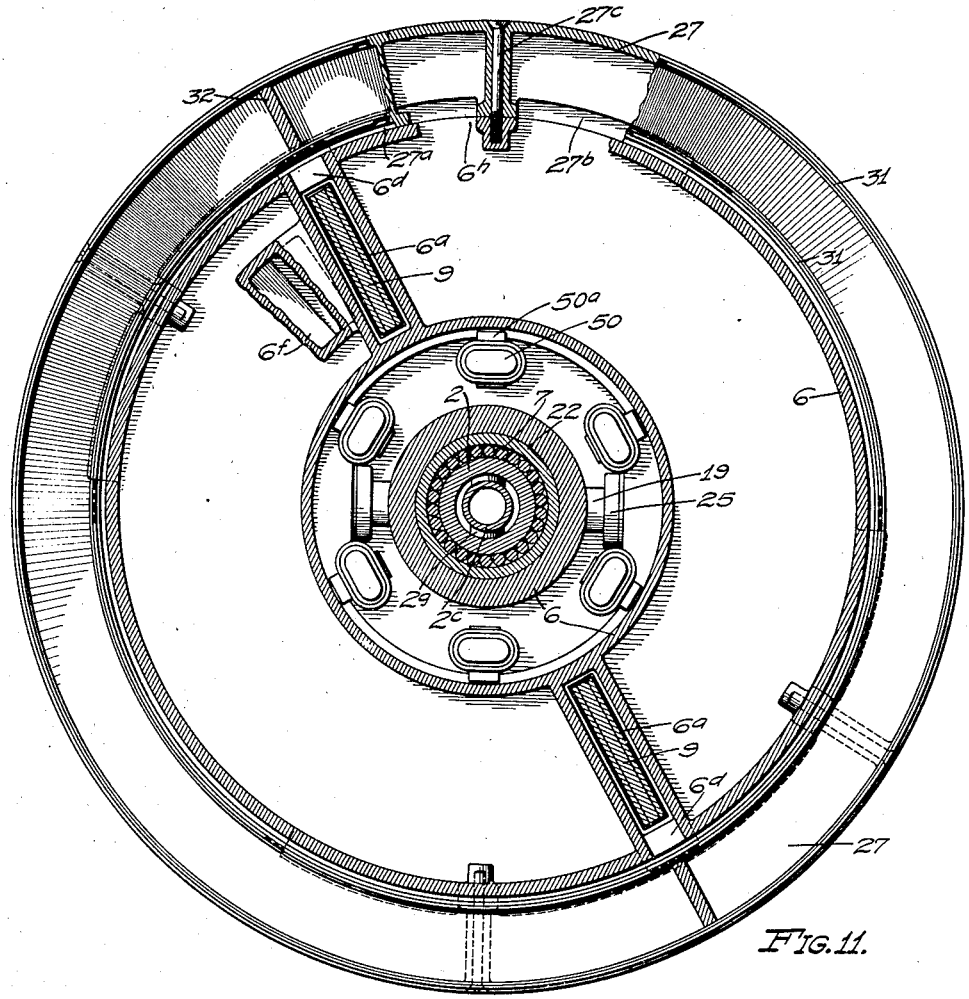
Fig.11.
Fig.12.　　Fig.13.
Inventor
ROLLIN O. McASSEY.
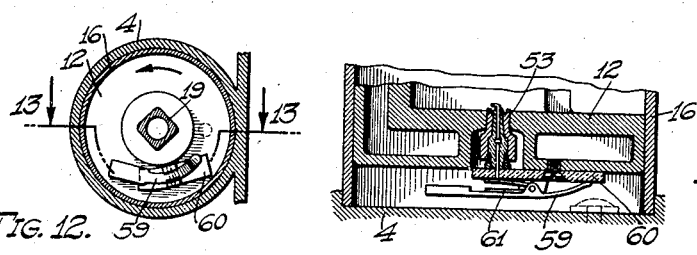
Attorney Patented Feb. 4, 1930

1,745,682

UNITED STATES PATENT OFFICE

ROLLIN O. McASSEY, OF SAN DIEGO, CALIFORNIA

GAS ENGINE

Application filed March 17, 1924. Serial No. 699,719.

My invention relates to gas engines, particularly to a rotary type of gas engine, and the objects of my invention are: first, to provide an engine of this class which has relatively few reciprocating parts, thus reducing to a minimum the wear, vibration and crystallization of the engine and increasing the efficiency thereof to a maximum; second, to provide an engine which is provided with a gradually deepening chamber and with a movable member which is adapted to engage the walls of said chamber, forming tight compartments therewith for producing vacuum and compression; third, to provide an engine having a pair of mutually revolving members, forming tight compartments with each other, the one being provided with a gradually deepening chamber and the other serving as a support for a movable sealing member operable in said gradually deepening chamber; fourth, to provide an engine having mutually revolving members, one of said members being provided with a laterally movable abutment member forming with the other revolving member a tight compartment of gradually varying capacity with the mutual revolution of said members; fifth, to provide an engine having mutually revolving members, forming a sealed compartment with each other, one of said members being provided with a continuous, gradually curved engaging surface in the form of a warped plane; sixth, to provide an engine of this class in which the member provided with the continuous, gradually curved surface is also provided with a combined fuel gas, compression and explosion chamber means which is adapted to communicate with the compartment formed between the curved surface of one of said revoluble members and the other member mutually revoluble therewith; seventh, to provide a gas engine in which the cylinder provided with various fuel gas, compression and explosion chambers serves also as a valve means for regulating the flow of gas to and from certain compartments; eighth, to provide a novel fuel and gas control mechanism for gas engines; ninth, to provide a gas engine in which the combustion chamber is substantially surrounded by a fuel chamber and in which the fuel gases come in contact with the outer wall of the combustion chamber, thus aiding in cooling the same and at the same time heating the fuel gases; tenth, to provide a novel fluid starting means for gas engines; eleventh, to provide a novel air compressing means in combination with a gas engine; twelfth, to provide a novel speed control means for a gas engine of this class; thirteenth, to provide a novel combined starting, air compressing and speed control mechanism for an engine of this class; fourteenth, to provide a novel ignition mechanism for gas engines; fifteenth, to provide a novel means for automatically advancing and retarding the spark of gas engines; sixteenth, to provide as a whole a novelly constructed engine of this class, and seventeenth, to provide such an engine which is simple and economical of construction proportionate to its functions, durable, easy to operate, and which will not readily deteriorate or get out of order.

Figure 2:
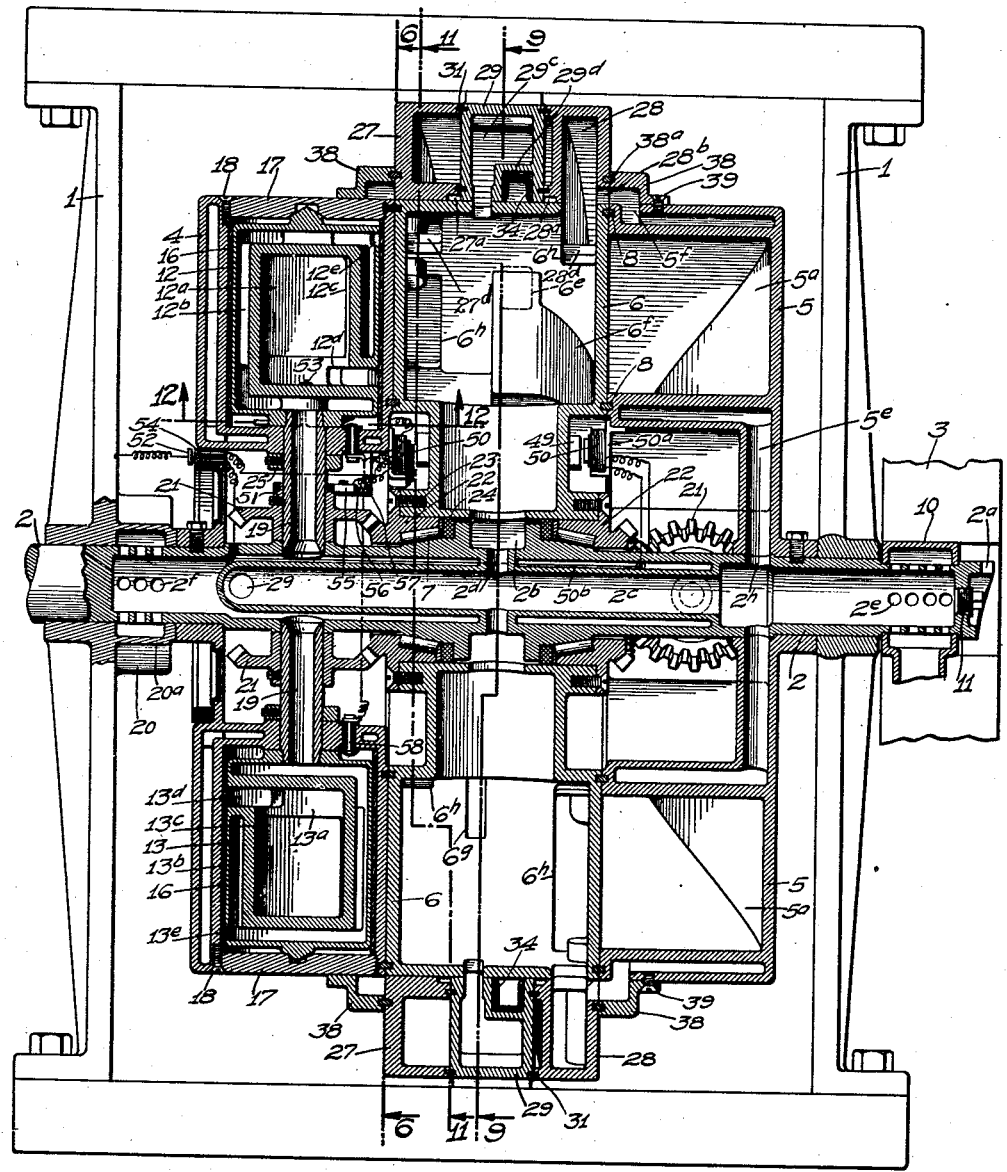
Figure 6:
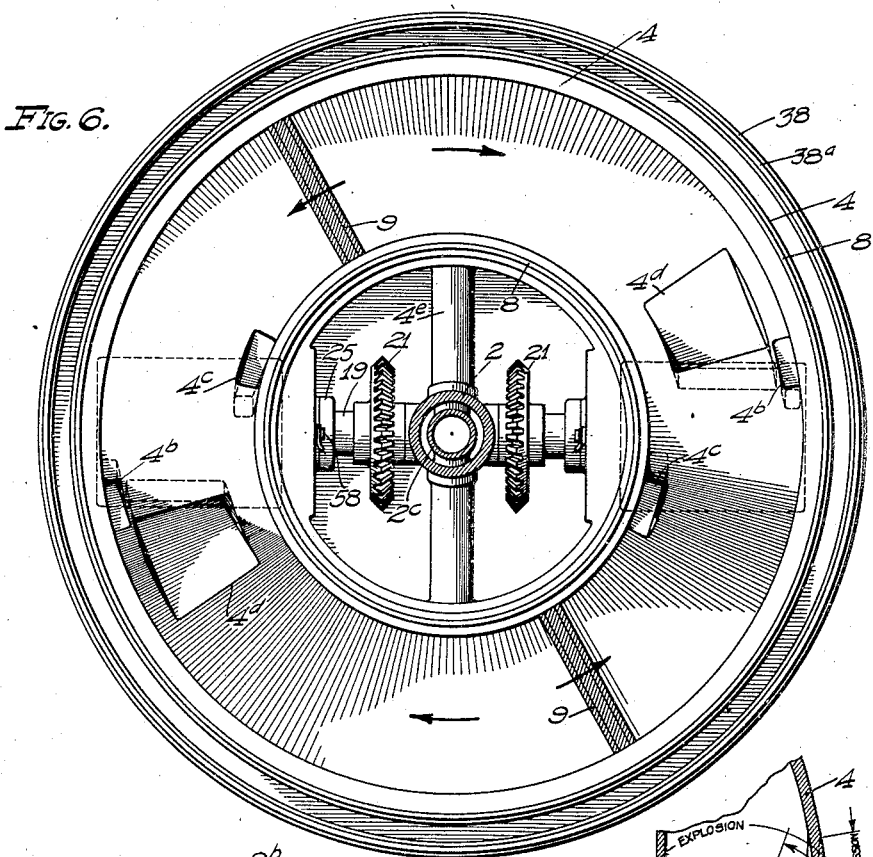
Figure 8:
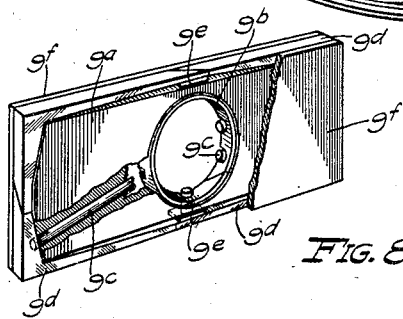
Figure 7:
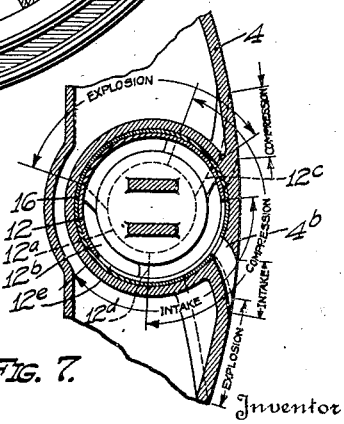

With these and other objects in view, as will appear hereinafter, my invention consists of certain novel features of construction, combination and arrangement of parts and portions, as will be hereinafter described in detail and particularly set forth in the appended claims, reference being had to the accompanying drawings and to the characters of reference thereon, which form a part of this application, in which:

Figure 1 is a side elevational view of my rotary type gas engine, showing the same in connection with a cooling radiator and showing certain parts and portions of the engine and connections thereof broken away and in section to facilitate the illustration; Fig. 2 is a sectional view thereof in plan with the section taken through 2—2 of Fig. 1; Fig. 3 is a developed diagrammatic view of the power producing portions of my engine with the view taken at the periphery thereof, showing the relation between the main revolving members, the revolving fuel and gas control means, and the laterally movable abutment members; Fig. 4 is a developed diagrammatic view of the engine starting, air compressing and engine control means, showing the control valve slightly enlarged and fragmentarily connected thereto and with a supply tank; Fig. 5 is a view of the control valve with one side thereof broken away, showing the same in a differently shifted position and connected to certain fluid conductors; Fig. 6 is a transverse sectional view of my engine with the section taken through 6—6 of Fig. 2; Fig. 7 is an enlarged diagrammatic view taken transversely through the fuel and gas control cylinder, showing its relation and the various openings thereof with the inlet and outlet ports in the revolving member supporting the same; Fig. 8 is a perspective view of the reciprocating, sealing and abutment means, showing certain parts and portions thereof broken away and in section to facilitate the illustration; Fig. 9 is another transverse sectional view of my gas engine with the section taken through 9—9 of Fig. 2, showing certain parts and portions thereof broken away to facilitate the illustration; Fig. 10 is a diagrammatic view of the electric wiring arrangement and ignition system of my engine; Fig. 11 is another transverse sectional view of my engine with the section taken through 11—11 of Fig. 2, showing certain parts and portions thereof broken away to facilitate the illustration; Fig. 12 is a transverse sectional view of the normally inner end of a fuel and gas cylinder with the section taken through 12—12 of Fig. 2, and Fig. 13 is an enlarged sectional view of the contact means and spark plug in connection with one of the cylinders with the section taken through 13—13 of Fig. 12.

Like characters of reference refer to similar parts and portions throughout the several views of the drawings.

The drive-shaft, designated 2, of my engine is revolubly mounted in the opposite sides of the supporting frame, designated 1, which supports the engine, the one end of said shaft extending into and partially through the radiator 3, and is provided at said end with a clutch portion $2^a$ for rotating the shaft by means of a crank. On the shaft 2 are mounted and secured chamber members 4 and 5 which are spaced from each other with similar depressed and raised portions thereof, positioned in circular staggered relation relative to each other. Said depressed portions are located at the inner sides and near the peripheries of the members 4 and 5 and are hereafter designated as chambers $4^a$ and $5^a$, respectively, said chambers forming substantially continuous, annular, variable-depth channels in the inner faces of said members, the radially outer and inner surfaces of said channels being circular and concentric with the axes of rotation of said members, and the inside or bottom surfaces of said channels being gradually curved and varying in depth, in a direction parallel to the axis of rotation, from a minimum at the inner side faces of said members to a maximum near the opposite walls of said members substantially in the form of a dampened sine curve in circular form, as shown best in Fig. 3. The inside or bottom surfaces of the channels as designated herein are the surfaces forming the connecting walls between radially spaced apart circular inner and outer walls of the channels and positioned outwardly from the inner side faces of the members 4 and 5. The chambers $4^a$ and $5^a$, in the respective chamber members 4 and 5, serve variously and successively to create vacuums for drawing in fuel gases, for subsequently compressing the same into cylinders 12, 13, 14 and 15, to be described hereafter, for receiving the exploded gases under high pressure for imparting motion to the members 4 and 5 and also an intermediate member 6, and also for exhausting the spent exploded gases. The variable-depth chambers of each of the members 4 and 5 are positioned in opposed and staggered relation relatively to the chambers of the other member. The curved bottom surfaces of the oppositely positioned chambers or channels are equally spaced from each other in a direction parallel to their axes of rotation. Between the members 4 and 5, and positioned in engagement with the inner faces thereof, is the reciprocating bar supporting member or drum member 6 mentioned above, which is revolubly mounted at its hub portion on rollers 7 at the middle enlarged portion of the shaft 2. The member 6 is provided with hollow spokes extending outwardly from its hub portion, at the outer ends of which spokes is supported the hollow, annular portion $6^c$. The side faces of the hollow, annular portion of the revoluble drum member 6 provide the fourth sides of the chambers $4^a$ and $5^a$. The side faces of the member 6 also seal the ends of the chambers in each of the members 4 and 5, at the minimum depths thereof, from each other, thus forming two sealed chambers in each member. In each of the members 4 and 5, and the member 6, at the engaging surfaces thereof and positioned respectively outwardly and inwardly from the annular channels formed by the chambers $4^a$ and $5^a$, are provided annular grooves in which are positioned the annular sealing rings 8 for sealing said chambers. In the member 6 are reciprocally mounted, in diametrically opposed relation, a pair of sealing bars or abutment members 9, which extend into and at all times engage the inner walls of the chambers $4^a$ and $5^a$ or the bottom and side walls of the channels forming said chambers, substantially as shown in Fig. 3 of the drawings. Said curved bottom walls of the chambers $4^a$ and $5^a$ reciprocate said bars 9 mounted in the member 6. The ends of these bars extending into the chambers $4^a$ and $5^a$ continuously and variously divide the chambers 4ª and 5ª into two chambers of various capacity except when the ends of the bars are positioned against the bottom walls of least depth of said chamber, that is, at the portions where such walls engage the drum member 6. As the bars move through the chambers circumferentially, they simultaneously cause the spent gases at the forward side thereof to be exhausted and fuel gases to be drawn into the chambers at the rear or following sides, or cause at one side of these bars the fuel gases to be compressed and the bars to be moved by the exploded gases at the opposite or rear or following sides of the bars.

Each of the bars 9 are made in units of three plates, an inner plate 9ª and outer plates 9ᶠ positioned on either side of the inner plate. At the middle portion of the inner plate 9ª is loosely positioned the split, resilient ring 9ᵇ, which is provided with a plurality of notches on its one side in which are adapted to be positioned the correspondingly notched portions at the inner ends of the compression guide and supporting rods 9ᶜ, at the outer ends of which rods are secured the angular sealing members 9ᵈ. The sealing members 9ᵈ, of which there are four in number, are overlapped at their ends, as shown in Fig. 8 of the drawings. The longer ends or legs of said sealing members are preferably more flexible and are retained in certain outward positions by means of plungers 9ᵉ, which are also connected at their inner ends with the resilient ring 9ᵇ. The outer plates 9ᶠ are adapted to retain the lubricating oil between the several sealing members and also to seal the spaces between said members. With a bar constructed in this manner the compartments on either side of the bar are positively sealed from each other, and the outer edges of the bar which engage the walls of the chamber members are thoroughly lubricated.

Intermediate the ends of and around the reciprocating bars 9, and between the side faces of the revoluble member 6, are provided oil wells 6ª, which communicate at their inner sides, by means of oppositely positioned hollow spokes 6ᵇ of the member 6, with the hollow interior of the engine formed by the members 4, 5 and 6, which serves as an oil reservoir for the interior of the engine proper, as shown best in Figs. 2 and 9 of the drawings. The oil wells 6ª are adapted for lubricating the bars 9, the sealing members thereof, the outer engaging surfaces between the members 4, 5 and 6, and the engaging surfaces of the peripheral portion of the member 6 with the member 29, to be described hereafter. In order to prevent gases from passing from one side of the member 6 to the other and for retaining the lubricating oil in the wells 6ª, there are provided gasket members 26 around the reciprocating bars 9 near the side faces of the member 6, as shown in Fig. 3.

The hollow annular portion 6ᶜ of the member 6, between the bars 9 mounted therethrough, is adapted to be filled with circulating cooling water, which enters the hollow portion 6ᶜ through the remaining hollow spokes of the member 6. The inner ends of said spokes communicate with the annular channel 2ᵇ at the middle of the enlarged portion of the shaft 2, which annular channel communicates with the water tube 2ᶜ of said shaft by means of the ports 2ᵈ extending through the walls thereof. Said water tube is positioned centrally within and spaced from the wall of the hollow shaft 2 forming a channel between the same and the interior of the hollow shaft for the passage of fuel gas, as will be described later. The one end of the water tube 2ᶜ is open and is adapted to communicate with the water at the lower portion of the radiator 3 by means of a plurality of ports 2ᵉ near the end of said shaft extending into the radiator, there being provided around the shaft 2, at said perforated end, a water casing 10, which is connected with the radiator. At the same end of said shaft is provided a plug 11 for partially draining the water from the engine and the radiator and also for cleaning the water tube 2ᶜ.

In each of the chamber members 4 and 5, between the curved walls of the chambers at their minimum depths and the outer side walls of said members, are revolubly mounted, respectively, the cylinders 12, 13, 14 and 15, as shown best in Fig. 3 of the drawings. These cylinders primarily serve as valves of the chambers 4ª and 5ª for controlling the intake of fuel, containing the compressed fuel gases, and control the explosion of fuel gases therein and their discharge therefrom into the chambers 4ª and 5ª. The cylinders in each of the chamber members 4 and 5 are positioned in diametrically opposed relation with each other and with their axes extending through the axis of the main shaft, the cylinders in the member 4 being positioned in staggered relation relatively to the cylinders in the member 5. Each of the cylinders are revolubly mounted in sleeves 16 of a suitable bearing material and are retained in position within the sleeves 16 by means of caps 17, which caps are preferably retained in position by means of a plurality of screws 18, as shown in Figs. 1 and 2. The inner middle portions of said caps serve also as thrust bearings for the outer ends of the cylinders. Each of the cylinders 12, 13, 14 and 15 are provided with inner compression and explosion compartments 12ª, 13ª, 14ª and 15ª respectively, and also with outer fuel gas compartments 12ᵇ, 13ᵇ, 14ᵇ and 15ᵇ, which latter compartments substantially surround the inner compartments. Each of the inner compression and explosion compartments of the cylinders are provided with two outlets, a large explosion outlet or opening positioned at and communicating with the normally outer portion of said compartments, and a smaller compression outlet or opening positioned inwardly therefrom, as indicated respectively by $12^c$ and $12^d$, and $13^c$ and $13^d$ of the cylinders 12 and 13 in Figs. 2 and 3. The fuel gas compartments of each of the cylinders are provided with outlets at their normally outer ends, to permit the fuel gas in said compartments to be drawn therefrom, as indicated by $12^e$ and $13^e$ in Fig. 2. The fuel gas compartments of said cylinders communicate at their inner ends, by means of hollow spindles 19, with the interior of the drive-shaft. Said drive-shaft is provided at its one end, opposite the end provided with the ports $2^e$, with other ports $2^f$ through the wall thereof, which ported portion of the shaft is surrounded by an annular channel $20^a$ which forms the upper portion of the carbureter 20 which is secured to and supported by the frame 1, as shown in Figs. 1 and 2.

The hollow spindles 19 are revolubly mounted at their inner ends in the wall of the hollow shaft 2 and are revolubly mounted near the opposite ends in the chamber members 4 and 5. The outer ends of said spindles are polygonally shaped and extend into conforming recesses at the normally inner ends of the various cylinders for rotating the same. Near the inner ends of the spindles 19 but outside of the shaft 2 are secured the bevel gears 21, which mesh with and are adapted to be driven by the driving bevel gears 22, which are secured to the ends of the hub portion of the revoluble member 6 by means of screws 23. It will be noted that the bevel gears 22 are preferably made to form the outer races for the rollers 7 and are readily removable from the member 6 for removing the latter from its mounting. It will be also noted that there are provided felt washers 24 between the hub portion of the member 6 and the shaft 2 so as to retain the water and oil in their respective compartments. The bevel gears 21 are preferably held against the bosses on the hollow shaft 2 by means of collars 25 positioned around the spindles 19 in engagement with bosses on the inner portions of the chamber members, as shown best in Fig. 2.

In the curved walls of the members 4 and 5, contiguous to the portions in which the cylinders are revolubly mounted, are provided a plurality of ports, which are adapted to connect at different times and under different conditions the chambers in the chamber members with the compartments in the cylinders. The ports $4^b$ and $5^b$ in the curved walls of the members 4 and 5, which ports are positioned on the one side of the respective cylinders from which the respective bars recede, as indicated by the arrows in Figs. 3 and 6 of the drawings, and also shown in Fig. 7 are adapted to communicate respectively with the ports or outlets $12^e$ and $13^e$, as shown in Figs. 2 and 7, and $14^e$ shown in Fig. 3 when the cylinders are rotated to certain fuel intake positions, as shown by the cylinder 14 in Fig. 3. When the cylinders are rotated to certain positions about their axes in the direction shown by the arrows in Fig. 3, the openings, indicated by $12^d$ and $13^d$ in Figs. 2 and 3 of the cylinders are adapted to connect the combined compression and explosion compartments of the cylinders, as indicated by $12^a$, $13^a$, $14^a$ and $15^a$ in Fig. 3, with the respective chambers in the members 4 and 5 by means of ports in the curved walls of said members on the side of said cylinders toward the approaching bars 9, as indicated by $4^c$ in Figs. 3 and 6. When the cylinders are rotated farther about their axes the large openings, as indicated by $12^c$ and $13^c$ in Figs. 2 and 3, communicating with the combined compression and explosion compartments of the cylinders are adapted to communicate with the respective chambers in the members 4 and 5 by means of ports in the curved walls of said members on the side of the cylinders extending toward the receding bars 9, as indicated by $4^d$ and $5^d$ in Figs. 3 and 6.

Around the periphery of the revoluble member 6 is positioned a brake mechanism for either completely holding the member 6 against rotation and permitting the members 4 and 5 to operate freely against and relative to the stationary drum member 6, or for only partially holding or restraining the rotation of the member 6. It will be noted that the members 4 and 5 are movable relative to the member 6, and when the member 6 is free to rotate, it rotates at approximately the same speed as the members 4 and 5 but in the opposite direction. If the member 6 is free to rotate without resistance and the engine is under load, very little or no power will be imparted to the members 4 and 5 to carry the load, but the load will serve as a brake against the rotation of the members 4 and 5 and will permit the member 6 to rotate in the opposite direction at a speed approximately equal to the speed of the members 4 and 5 when the member 6 is held stationary. The brake mechanism referred to consists of a structure similar to the engine itself, namely, of chamber members 27 and 28, a reciprocating bar supporting member 29, and bars 32. The chamber members 27 and 28 are secured in spaced apart relation to the peripheral portion of the member 6 respectively by means of screws $27^c$ and $28^c$, as shown best in Figs. 1 and 11, the chamber portions of the members 27 and 28 being constructed similarly to those of the members 4 and 5 previously described. Intermediate the members 27 and 28 is positioned the stationary annular reciprocating bar supporting member 29, which forms with the variable-depth curved-walled chambers in the members 27 and 28, enclosed compartments. The member 29 is supported against rotation by the frame 1 and is secured at its opposite sides thereto by means of screws 30, as shown best in Fig. 9. There are also provided intermediate each of the members 27 and 28 and the stationary member 29, at their engaging surfaces, sealing rings 31, which extend into each of said members for sealing the compartments, formed by said members, at their inner and outer portions. At diametrically opposed portions in the member 29 are reciprocally mounted bars 32, which are adapted to extend into the variable-depth chambers of the members 27 and 28 and engage the oppositely positioned curved surfaces thereof, it being noted that the curved bottom surfaces of the oppositely positioned chambers or channels are at all points equidistant from each other, as described in connection with the members 4 and 5. The member 29 is provided with oil wells $29^a$ around each of the bars 32, which oil wells communicate with the annular channels $27^a$ and $28^a$ by means of the ports $29^b$, as shown best in Figs. 1 and 9. The annular oil channels $27^a$ and $28^a$ are formed at the inner portions of the engaging surfaces of the members 27 and 28 with the member 29 and communicate with the oil wells $6^a$ in the member 6 by means of ports $6^d$ in the outer wall of the member 6, as shown best in Figs. 1 and 11. There are also provided gasket members 33 around the reciprocating bars 32 to retain the oil in the wells $29^a$.

The member 29 is provided with two continuous annular channels $29^c$ and $29^d$, the latter being smaller than the former and lined with a non-heat-conducting jacket 34. The channel $29^d$ communicates at all times with the exhaust ports $6^e$ in the peripheral wall of the member 6, said ports $6^e$ communicating with the sides of the member 6 by means of ducts $6^f$, there being provided one duct in front of each reciprocating bar 9 on alternate sides of the member 6, as shown best in Fig. 3. It will be noted that the main portions of the channel $29^d$ between the reciprocating bars 32 communicate with each other by narrow passages between the peripheral wall of the member 6 and the portions enclosing said reciprocating bars, as shown best in Fig. 9. The channel $29^d$ is preferably provided with two outlets $29^e$, as shown in Figs. 4 and 9, which outlets are connected with exhaust conductors 35.

The channel $29^c$, adapted to conduct the circulating water from the engine to the radiator, communicates at all times with the hollow annular portion $6^c$ of the revoluble member 6 by means of ports $6^g$ in the peripheral wall of said member. The channel $29^c$ is preferably provided with two outlets $29^f$, one at the upper and another at the lower side thereof, which communicate, respectively, with the circulating water conductors 36 and 37, which conductors are connected together and are also connected with the upper end of the radiator 3, as shown best in Fig. 1.

Each of the chambers $4^a$ and $5^a$ are cooled on three sides by water circulating in the chambers between the curved, and the outer and inner walls of the chambers $4^a$ and $5^a$ and the outer side, and the radially outer and inner walls of the members 4 and 5. Said water circulating chambers of the members 4 and 5 are connected by means of radial passages $4^e$ and $5^e$, respectively, with the water tube $2^c$ of the hollow shaft 2, the former passage $4^e$ communicating with said tube by means of the port $2^g$ at the one end of said tube, and the latter by means of the port $2^h$ in the wall of said shaft near the other end of said tube. Near the inner sides of the peripheral walls of the members 4 and 5 are provided ports $4^f$ and $5^f$, which connect the water chambers in the members 4 and 5 at all times with the annular water channel formed between the channel members 38, secured to the periphery of the members 4 and 5 by means of screws 39, and the outer side walls of the annular chamber members 27 and 28, there being provided sealing rings $38^a$ at the engaging surfaces of the members 38 with the members 27 and 28. In the outer side walls of the members 27 and 28, forming the one side of the annular water channels with the members 38 are provided openings $27^b$ and $28^b$, which connect said channels with the interior of the members 27 and 28 between the curved and the outer side walls thereof. The water chambers of the members 27 and 28 communicate with the interior of the revoluble member 6 by means of a plurality of ports $27^d$ and $28^d$, in the radially inner walls of the members 27 and 28 respectively, and other ports $6^h$ on either side of the peripheral wall of the member 6. Thus, a continuous flow of cooling water is provided from the one end of the shaft 2, communicating with the lower end of the radiator 3, separately into the members 4, 5 and 6 around the heated areas thereof, out through the common water channel of the member 29 into the conductors 36 and 37 and back to the top of the radiator.

The rotation of the chamber members 27 and 28 which are non-rotatably secured to the drum member 6, is controlled by a master control valve V, shown in Figs. 4 and 5, and by a plurality of fluid passages connecting the valve with a source of fluid under pressure and with the chambers in the chamber members, and also passages connecting said chambers with each other. In the stationary reciprocating bar supporting member 29 are provided two pairs of transverse passages $29^g$ and $29^h$, which are positioned respectively in front of and behind the two reciprocating bars 32 relatively to the mutual revolution of the member 29 with the members 27 and 28. The passages 29ᵍ and 29ʰ are adapted to connect respectively the compartments in front of and behind the bars 32 at the opposite sides of the member 29. The separate passages 29ᵍ are connected with each other by means of a conductor 40, and the passages 29ʰ are connected with each other by means of a conductor 41. With the conductors 40 and 41 and also with the one end of the conductor 42, connected with an air pressure tank 43, is connected the multi-way control valve V. Said valve consists of a hollow casing 44 in which is rotatably mounted a disc-shaped valve member 45, at the central portion of which is secured a control rod 46 which extends outwardly through said casing. On the rod 46 outside of the valve casing is secured an indicating finger 47 which is adapted to indicate the position of the valve member 45 and also to limit the rotation of the same by the engagement thereof with the stops 48 on the valve casing. The valve shown in Fig. 4 of the drawings is rotated to a position to start the engine, while the sectional view of the valve, shown in Fig. 5 of the drawings, shows the same in a position to control the engine at a slow speed and also to compress air in the chambers of the members 27 and 28 into the pressure tank 43. With the valve member in the position shown in Fig. 4 the air under pressure in the tank is adapted to flow from the arcuate passage 45ᵃ at the periphery of the valve member 45 through the tubular connecting passage 45ᵇ into the diametrically opposed arcuate passage 45ᶜ, from which the air is permitted to flow through the conductors 41 into the compartments behind the reciprocating bars 32 for rotating the members 27 and 28 about their axes in the direction of the arrows indicated in Fig. 4 of the drawings. When the valve member 45 is rotated so that the indicating finger 47 is in the sector indicated by the word "Free" on the valve casing, the air under pressure in the tank 43 is shut off and the conductors 40 and 41 are connected respectively with the diametrically opposed arcuate passages 45ᵈ and 45ᵉ, which are connected by means of the passage 45ᶠ with the atmosphere through a port 44ᵃ on the back side of the valve casing 44. Thus no resistance is offered to the rotation of the members 27 and 28 due to rarefying or compressing of air. When the valve member is shifted so that the indicating finger is in the sector indicated by "Low" and "High", the low position of which is shown in Fig. 5 of the drawings, the conductor 41 is connected with the passage 45ᵉ which is connected with the atmosphere, thus permitting air to flow freely into the compartments at the back side of the reciprocating bars. Also, when the valve member is in the last mentioned position, the air in the compartments at the front side of the reciprocating bars 32 is compressed by reason of the rotation of the members 27 and 28 in the direction indicated by the arrows. The air, compressed in the above manner is forced through the conductor 40 into the passage 45ᶜ and thence into the pressure storage tank 43, thus replenishing the supply of compressed air in the tank. Should the valve member be rotated to its extreme clockwise position, the air under pressure in the tank 43 is shut off by means of the portion of the valve member between the passages 45ᵃ and 45ᵈ, while the air in the compartments at the forward side of the reciprocating bars 32 is also prevented from escaping, thus locking the members 27 and 28, and therefore the revoluble member 6, relatively to the reciprocating bar supporting member 29, and permitting the chamber members 4 and 5 to be rotated at a greater speed in the direction indicated by the arrows in Fig. 3.

The ignition mechanism of my engine consists primarily of a magneto positioned within the middle portion of my engine. revoluble breaker members 51, spark plugs 53 in each of the cylinders, a switch 52, and speed-controlled contact means, as illustrated in Figs. 2, 10, 12 and 13 of the drawings. The magneto of my engine consists of a plurality of bar magnets 49 and two sets of separately connected induction coils 50, there being provided one set of coils at each end of said magnets as shown best in Fig. 2. The bar magnets are positioned between and secured, intermediate their ends, to the spokes of the revoluble member 6. The induction coils 50 are supported by means of brackets 50ᵃ at the middle hollow portions of the chamber members 4 and 5, as shown in Figs. 2, 6, 9 and 11. The one terminal of each set of the primary windings of the induction coils 50 is connected with an annular electrical conductor 54. Said annular conductors are positioned concentrically on the outside of and insulated from the chamber member 4, as shown in Fig. 2. The conductor 50ᵇ from the primary winding of the induction coils supported by the chamber member 5 extends into and through the hollow shaft 2 intermediate the outer wall of the same and the water tube positioned therein. A switch 52 is positioned contiguous to the annular conductors 54 and is adapted to connect and ground the same with the frame, as shown diagrammatically in Fig. 2. The other terminals of the primary windings of each set of induction coils are connected to brushes 55 which are mounted on insulating supports 57 supported by the respective chamber members. Around one of the hollow spindles 19 on each side of the engine are secured disc shaped breaker members in the form of commutators, which are adapted to be engaged by the brushes 55, which brushes are held in engagement with said breaker members by means of springs 56. Each of the breaker members 51 is provided at diametrically opposed portions of its periphery with segments 51ª of insulating material, which are adapted to make and break the electric circuit of the primary windings as the brushes 55 pass over the same when the breaker members 51 revolve. It will be here noted that the rapid make and break of said current occurs twice during each revolution of the cylinder; however, the spark plugs 53 function only once during each revolution of the respective cylinders as will be described later. One terminal of the secondary windings of each set of induction coils are grounded on the engine, while the other terminals thereof are connected with conductors 58 which extend through and are insulated from the inner walls of each of the chamber members 4 and 5, as shown best in Fig. 2. At the inner faces of the cylinders are secured insulating supports 60 on which are pivotally mounted the contact members 59 which are adapted to engage the inner ends of the conductors 58 once during each revolution of the cylinders. The normally forward ends of the contact members 59 are curved outwardly and are adapted to engage at the curved ends thereof the insulating supports 60. Springs 61 are positioned between the insulating supports 60 and the opposite ends of the contact members 59, for forcing said ends, which are weighted, outwardly from their supports, and the other ends thereof in engagement with said supports. The springs 61 serve also as conductors for transmitting the current conducted to the contact members 59 to the spark plugs 53 mounted at the inner ends of each of the cylinders, as shown best in Fig. 13.

It will be here noted that the normally forward ends of the contact members 59 are so constructed that, when the engine is accelerated, the point of contact of the contact members 59 with the inner ends of the conductors 58 is automatically advanced by reason of the opposite weighted ends of the contact members 59 being forced outwardly by centrifugal force, relatively to the axis of rotation of the members 4 and 5 due to the rotation of said members. The action of centrifugal force causes the weighted end of the contact member 59 to compress the spring 61 and force the curved end of said contact member toward the contact end of the conductor 58, thus automatically advancing the ignition of the gases in the cylinders as the speed of the members 4 and 5 is increased.

The operation of the engine is as follows:
In order to start the engine the valve member 45 of the control valve V is rotated clockwise so that the indicating finger 47 is directed toward the sector indicated by "Start", which permits the air, under pressure, from the tank 43 to rotate the members 27 and 28 and therefore the member 6, as indicated by the arrows in Figs. 3 and 4. When the cylinder 14 is in a position to permit fuel gas to be drawn into one of the chambers 5ª of the chamber member 5, as shown in Fig. 3, the cylinder 12 is in a position to receive in its compression and explosion compartment the fuel gas previously drawn in by the reciprocating bars 9 from the cylinder 13. During the operation of bringing about the foregoing conditions the gas compressed in the cylinder 15 is being exploded while the fuel gas in the cylinder 13 has been exploded and is expanding, forcing one of the reciprocating bars 9 away from the same, and therefore rotating the member 6 about its axis. While fuel gas is being drawn into one of the chambers 5ª from the cylinder 14, other fuel gas previously drawn into the other chamber 5ª, the immediately preceding quarter cycle or half a revolution of the chamber members, from the cylinder 15 is being compressed in the cylinder 14. Similarly and at the time of the above function, while gas is being compressed in the cylinder 12 at the opposite side of the drum member 6, which cylinder will have rotated the greater portion of its compression cycle, that is, with the intake 12ᵈ to the compartment 12ª of the cylinder 12, almost closed, other fuel gas is being drawn from the compartment 12ᵇ of the cylinder 12 preparatory to compressing the same during the next quarter cycle of the member 4 into the cylinder 13, as shown best in the diagrammatic illustration in Fig. 7. While the fuel gas is being drawn into one of the chambers 5ª from the cylinder 14 the burnt gases previously exploded in said cylinder are being exhausted, by reason of the decreasing compartment on the opposite side of the reciprocating bar 9 from the cylinder 14, through the exhaust duct 6ᶠ and through the exhaust port 6ᵉ into the exhaust channel of the member 29. After the engine has started the valve member 45 is rotated about its axis so that the indicating finger 47 is directed to the sector indicated by "Free", thus cutting off the air from the tank 43 and permitting the engine to run free, as previously described. To regulate the power transmitted to the drive-shaft the valve member 45 is rotated to the low or high positions as desired. If the valve is in the low position, less resistance is offered to the rotation of the member 6 in the direction of the arrows, thus permitting the same to revolve in one direction while the drive shaft revolves at a slow speed in the opposite direction. As the valve member is rotated toward the high position, greater resistance is offered to the rotation of the member 6, thus correspondingly increasing the speed of the drive-shaft.

It is obvious from this construction, as illustrated in the drawings and disclosed in the foregoing specification, that there is provided an engine as aimed at and set forth in the objects of the invention, and though I have shown and described a particular construction, combination and arrangement of parts and portions, I do not wish to be limited to this particular construction, combination and arrangement, but desire to include in the scope of my invention the construction, combination and arrangement substantially as set forth in the appended claims.

Having thus described my invention, what I claim as new and desire to secure by Letters Patent, is:

1. In an engine, a pair of mutually revoluble members positioned contiguous to each other, one of said members being provided with a chamber of variable depth forming with the other member an enclosed compartment, a movable abutment member mounted in said other member adapted to extend into and engage the walls of the member provided with said chamber, and a unitary fuel compression and control means mounted in one of said mutually revoluble members, and mechanically connected and timed with the other of said members.

2. In an engine, a pair of mutually revoluble members positioned contiguous to each other, one of said members being provided with a chamber of variable depth forming with the other member an enclosed compartment, a movable abutment member mounted in said other member adapted to extend into and engage the walls of the member provided with said chamber, and a unitary fuel compression, explosion and gas control cylinder revolubly mounted in the member provided with said chamber.

3. In an engine, a pair of mutually revoluble members positioned contiguous to each other, one of said members being provided with a chamber of variable depth forming with the other member an enclosed compartment, a movable abutment member mounted in the other of said mutually revoluble members and adapted to extend into and engage the walls of the member provided with said chamber, and a combined gas cylinder and valve means, provided with a plurality of compartments, revolubly mounted in the member provided with said chamber near the portion of said chamber of least depth.

4. In an engine, a chamber member and an abutment member support revolubly mounted relatively to and positioned adjacent each other, said chamber member being provided in the side thereof adjacent said abutment member support with a chamber having a gradually curved bottom of variable depth, an abutment member movably mounted in said support and extending into said chamber in engagement with the curved bottom wall thereof and controlled in its movement by the engagement with said curved bottom wall, and a gas control member, provided with separated compartments, movably mounted in said chamber member, the compartments of said gas control member being adapted to communicate with the chamber in the chamber member.

5. In an engine, a pair of spaced apart chamber members provided with chambers having bottoms in curved form and of various depths, and an abutment member support positioned between and contiguous to said chamber members, said chamber members and said abutment member support being revolubly mounted and revoluble relatively to each other.

6. In an engine, a pair of spaced apart chamber members provided with chambers having bottoms in curved form and of various depths, an abutment member support positioned between said chamber members, said chamber members and said abutment member support being revolubly mounted and revoluble relatively to each other, and abutment members reciprocally mounted in said support and adapted to extend into the chambers of said chamber members and simultaneously engage the curved bottom surfaces of each, the reciprocal movement of said abutment members being controlled by the curved bottom walls of said chamber members.

7. In an engine, a pair of spaced apart chamber members provided with chambers having bottoms in curved form and of various depths, an abutment member support positioned between said chamber members, said chamber members and said abutment member support being revolubly mounted and revoluble relatively to each other, abutment members reciprocally mounted in said support and adapted to extend into the chambers of said chamber members and simultaneously engage the bottom surfaces of each, the reciprocal movement of said abutment members being controlled by the curved bottom walls of said chamber members, and a plurality of fluid control members movably mounted in said chamber members adapted to connect the chambers therein with a source of fluid.

8. In an engine, a pair of spaced apart, revolubly mounted chamber members provided at their inner sides with continuous curved-bottom channels substantially in the form of sine curves forming from apex to apex separate chambers, the chambers of each of the chamber members being positioned in staggered relation with the chambers of the other chamber member.

9. In an engine, a pair of spaced apart, revolubly mounted chamber members provided at their inner sides with continuous curved-bottom channels substantially in the form of sine curves forming from apex to apex separate chambers, the chambers of each of the chamber members being positioned in staggered relation with the chambers of the other chamber member, a revolubly controlled reciprocating bar supporting member positioned between said chamber members and revolubly mounted relatively thereto, and a plurality of bars reciprocally mounted in said bar supporting member adapted to extend into the chambers of said chamber members and simultaneously engage the curved bottom walls of each.

10. In an engine, a pair of spaced apart, revolubly mounted chamber members provided at their inner sides with continuous curved-bottom channels substantially in the form of sine curves forming from apex to apex separate chambers, the chambers of each of the chamber members being positioned in staggered relation with the chambers of the other chamber member, a reciprocating bar supporting member positioned between said chamber members and revolubly mounted relatively thereto, a plurality of bars reciprocally mounted in said bar supporting member adapted to extend into the chambers of said chamber members and simultaneously engage the curved bottom walls of each, and a plurality of cylinders, provided with fuel gas compartments and compression and explosion compartments, revolubly mounted in said chamber members, the separate compartments thereof being adapted to separately communicate with the chambers of said chamber members.

11. In an engine, a chamber member and an abutment member support revolubly mounted relatively to and positioned adjacent each other, said chamber member being provided with a chamber of variable depth forming with the abutment member support an enclosed compartment, and fluid and valve means in connection with one of said relatively revoluble members for retarding the same for controlling the revolution of the other.

12. In a gas engine, a power-producing unit, a control chamber member provided with a chamber having a gradually curved bottom of variable depth, a control abutment member support positioned contiguous to said control chamber member, said control chamber member and said control abutment member support being revolubly coacting, an abutment member movably mounted in said abutment member support and adapted to extend into said chamber member, one of said control members being secured to said power-producing unit, and a control valve means in connection with said relatively revoluble control members for controlling the movements of said power-producing unit.

13. In an engine, a chamber member provided with a chamber having a gradually curved bottom of variable depth, an abutment member support, said chamber member and said support being revoluble relatively to each other, an abutment member movably mounted in said support adapted to extend into said chamber and engage the curved bottom wall thereof, a control chamber member provided with a chamber having a gradually curved bottom of variable depth, a control abutment member support positioned contiguous to said control chamber member, said control chamber member and said control abutment member support being revolubly coacting, and a control abutment member movably mounted in said control abutment member support and adapted to extend into said control chamber member, one of said relatively revoluble control members being secured to one of said first mentioned relatively revoluble members.

14. In an engine, a chamber member provided with a chamber having a gradually curved bottom of variable depth, an abutment member support, said chamber member and said support being revoluble relatively to each other, an abutment member movably mounted in said support adapted to extend into said chamber and engage the curved bottom wall thereof, a control chamber member provided with a chamber having a gradually curved bottom of variable depth, a control abutment member support positioned contiguous to said control chamber member, said control chamber member and said control abutment member support being revolubly coacting, a control abutment member movably mounted in said control abutment member support and adapted to extend into said control chamber member, one of said relatively revoluble control members being secured to one of said first mentioned relatively revoluble members, and a fluid control valve means in connection with said relatively revoluble control members for controlling the movement of said first mentioned relatively revoluble members.

15. In a gas engine, a rotatable cylinder provided with a compression and combustion chamber and a fuel gas chamber substantially surrounding the same.

16. In a gas engine, a rotatable cylinder provided with a compression and combustion chamber and a fuel gas chamber substantially surrounding the same, and a chamber member in which said cylinder is rotatably mounted, said chamber member being provided with chambers adapted to alternately serve as compression and power means and adapted to separately communicate with the chambers of said cylinder.

17. In a means of the class described, a pair of coacting, mutually revoluble members, a pair of coacting power controlling members, one of said latter members being fixed and the other secured to one of said first mentioned members, and a fluid control valve connected with the fixed power controlling member for controlling the mutual revolution of the other power controlling member therewith.

18. In a means of the class described, a revoluble member, a pair of coacting power controlling members, one of said last mentioned members being fixed and the other secured to said revoluble member, and a fluid control valve connected with the fixed power controlling member for controlling the revolution of the other power controlling member therewith.

19. In a means of the class described, a revoluble member, a pair of coacting compression and partial vacuum producing members mounted in association with said revoluble member, one of the members of said pair of coacting compression and partial vacuum producing members being fixed against revolution and the other secured to said revoluble member, and a fluid control valve connected with said fixed member for controlling the compression and partial vacuum producing action of said pair of members.

20. In a means of the class described, a revoluble member, a chamber member provided with a chamber having a gradually curved bottom of various depths, an abutment member support positioned contiguous to said chamber member and revoluble relatively thereto, an abutment member movably mounted in said abutment member support and adapted to extend into the chamber of said chamber member, and a control valve means connected with one of said relatively revoluble members for controlling their relative movements.

21. In a means of the class described, a revoluble member, a chamber member provided with a chamber having a gradually curved bottom of various depths, an abutment member support positioned contiguous to said chamber member and fixed against revolution, said chamber member being secured to said revoluble member and revoluble relatively to said abutment member support, an abutment member movably mounted in said abutment member support and adapted to extend into the chamber of said chamber member, and a valve means in connection with said abutment member support for controlling the revolution of said chamber member relatively thereto.

22. In a gas engine structure, a longitudinally revoluble compression and explosion cylinder, a contact member pivotally mounted at one end of said cylinder adapted to be shifted about its pivotal axis with the revolution of said cylinder about its axis of longitudinal revolution, and a spark plug extending from said end of said cylinder into the explosion chamber thereof and connected with said contact member.

23. In a gas engine structure, an axially and longitudinally revoluble fuel compression and explosion cylinder, a spark plug extending from one end to the interior thereof, and a weighted contact member pivotally mounted at said one end of said cylinder and connected with said spark plug adapted to be shifted about its pivotal axis with the longitudinal revolution of said cylinder.

24. In a gas engine structure, an axially and longitudinally revoluble fuel compression and explosion cylinder, a spark plug extending from one end to the interior thereof, a weighted contact member pivotally mounted at said one end of said cylinder and connected with said spark plug, a revoluble means for supporting said cylinder and provided with a contact member adapted to be variously engaged by said first mentioned contact member, said first mentioned contact member being adapted to be shifted about its pivotal axis with the longitudinal revolution of said cylinder.

In testimony whereof, I have hereunto set my hand at San Diego, California, this 8th day of March, 1924.

ROLLIN O. McASSEY.